United States Patent

Amagi et al.

[15] 3,671,610

[45] June 20, 1972

[54] CROSS-LINKED GRAFT COPOLYMER OF STYRENE AND METHYL METHACRYLATE UPON A BUTADIENE POLYMER

[72] Inventors: Yasuo Amagi; Masaki Ohya; Zenya Shiiki; Haruhiko Yusa, all of Iwaki-shi, Japan

[73] Assignee: Kureha Kagaku Kogyo Kabushiki Kaisha, Tokyo, Japan

[22] Filed: Nov. 14, 1969

[21] Appl. No.: 876,920

Related U.S. Application Data

[63] Continuation-in-part of Ser. No. 570,261, Aug. 4, 1966, abandoned.

[30] Foreign Application Priority Data

Aug. 9, 1965 Japan....................................40/48036
Feb. 5, 1966 Japan.....................................41/6652
Feb. 5, 1966 Japan.....................................41/6653

[52] U.S. Cl. ............260/880 R, 260/29.7 UA, 260/29.7 UP, 260/876 R, 260/885, 260/886
[51] Int. Cl.......................................C08f 19/08, C08f 37/18
[58] Field of Search........................................260/880, 876 R

[56] References Cited

UNITED STATES PATENTS 3,328,488  6/1967  Delacretaz et al. .....................260/880
3,041,310  6/1962  Luftglass et al.......................260/80.7

FOREIGN PATENTS OR APPLICATIONS 629,066  10/1961  Canada..................................260/876

*Primary Examiner*—Murray Tillman
*Assistant Examiner*—Wilbert J. Briggs, Sr.
*Attorney*—Wenderoth, Lind & Ponack

[57] ABSTRACT

Butadiene-styrene-methyl methacrylate copolymers prepared by graft-polymerization with cross-linked butadiene or polybutadiene-styrene copolymer latex of styrene-methyl methacrylate monomers and a cross-linking agent capable of copolymerizing with said monomers in two steps.

Polyvinyl chloride resins incorporated with the graft copolymer exhibits improved mechanical strength and other physical properties.

2 Claims, 1 Drawing Figure

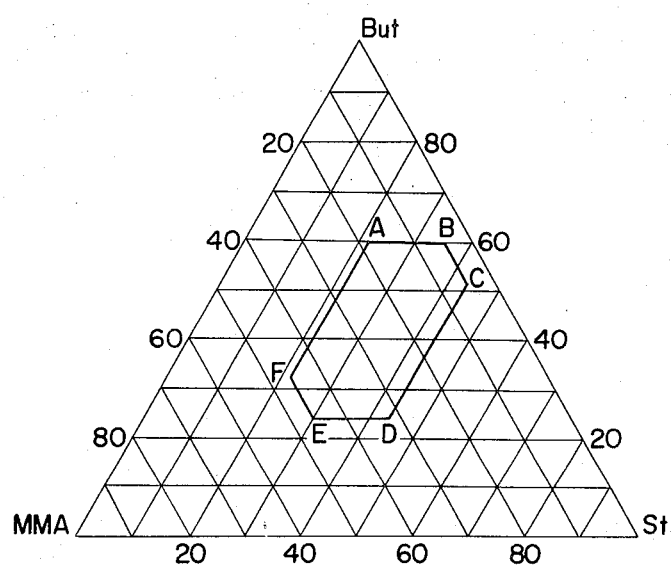

CROSS-LINKED GRAFT COPOLYMER OF STYRENE AND METHYL METHACRYLATE UPON A BUTADIENE POLYMER

REFERENCE TO RELATED APPLICATION

This application is a continuation-in-part of our copending application, Ser. No. 570,261 filed Aug. 4, 1966, and now abandoned, for "Polymer Composition and Process for Producing the Same".

BACKGROUND OF INVENTION

This invention relates to butadiene-styrene-methyl methacrylate graft copolymers (hereinafter referred to as "MBS resins"). More particularly, the invention concerns a new MBS resin which, upon being mixed with a polyvinyl chloride or a copolymer containing a polyvinyl chloride as a principal constituent, is capable of imparting high transparency, impact resistance, and resistance to the stress whitening through bending to the resulting shaped articles of the composition.

Heretofore, the so-called "graft copolymers" produced by causing a post polymerization (or a consecutive polymerization which will hereinafter be denoted merely as "polymerization") of vinyl monomers such as styrene, acrylonitrile, or methyl methacrylate either independently or as a mixture of a plurality thereof to a rubber-like polymer latex have been well known.

These graft copolymers have good mechanical strength and have, therefore, been used independently for various shaped articles. In addition, these graft copolymers have been mixed with other resins such as polyvinyl chlorides to improve the impact resistance of shaped articles of these other resins.

However, most of the graft copolymers produced by hitherto known methods, while being capable of improving the impact resistance of polyvinyl chlorides when mixed and kneaded therewith, have been disadvantageous in that they produce products which are deficient in transparency and lack in resistance to the weathering. Particularly, resin compositions containing acrylonitrile as a constituent thereof has disadvantages such as low heat stability.

Furthermore, when shaped articles produced from these resins such as sheets, bottles, etc. are bent, the bent portions of the articles as well as the neighboring portions thereof become extremely cloudy, whereby only products of low commercial value are obtained.

SUMMARY OF INVENTION

It is therefore an object of the present invention to provide MBS resins which, upon being mixed and kneaded in minimal quantities with polyvinyl chloride, is capable of imparting to shaped articles formed from the resulting resin composition practically excellent propeties such as high impact resistance, high transparency, resistance to weather, high heat stability, and almost no occurrence of the stress-whitening at bent portions of the products.

It is another object of the present invention to provide polyvinyl chloride resin composition produced by mixing and kneading polyvinyl chloride and the above-mentioned MBS resins manufactured for the above-mentioned particular purpose and exhibiting practically high impact resistance, high transparency, resistance to weather, high heat stability, and almost no occurrence of the stress-whitening at bent portions of products formed from such resin composition.

It is other object of the present invention to provide an improved method of producing cross-linked graft copolymer of butadiene-styrene-methylmethacrylate-divinyl compound having excellent properties in a relatively simple and economical manner.

The foregoing objects and other objects of the present invention will become more apparent from the following description of the invention when read in conjunction with the accompanying drawing.

BRIEF DESCRIPTION OF DRAWING

In the drawing, single FIGURE is a graphical representation with triangular co-ordinates indicating the proportions of three constituent monomers of MBS resins according to the invention.

DETAILED DESCRIPTION OF INVENTION

The MBS resins of the invention can be obtained, in general, by emulsion-polymerization of butadiene or a monomer mixture of butadiene as the principal constituent and styrene, with addition of a small quantity of a cross-linking agent, to produce a polymer latex, causing a monomer mixture containing styrene and methyl methacrylate and a small quantity of a cross-linking agent as an additive to be adsorbed on the polymer latex and be polymerized thereon, or further adding thereto methyl methacrylate containing a cross-linking agent, and causing polymerization, and subjecting the latex thus obtained to salting out, whereby MBS resin in the form of fine particles can be obtained.

By mixing from 5 to 20 parts by weight of an MBS resin obtained in this manner with from 95 to 80 parts by weight of a polyvinyl chloride and forming shaped articles from the resulting resin, it is possible to produce products having the above-described excellent properties.

This MBS resin according to the invention may be considered to function in the following manner. When this MBS resin is mixed and kneaded with a polyvinyl chloride, rubber component particles of constant size are dispersed within the polyvinyl chloride in a form wherein they are protected by respective layers therearound of styrene-methyl methacrylate resin and methyl methacrylate resin. In this case, the styrene-methyl methacrylate layer is highly compatible with the rubber component, while the methyl methacrylate layer is highly compatible with the polyvinyl chloride. Moreover, as the plastic constituents in the respective latex particles thus graft-copolymerized are all cross-linked, the adhesion between the MBS particles is weak, whereby these particles can be readily dispersed within the polyvinyl chloride resin in a uniform manner. As a result, the transparency of the product is increased, and, at the same time, separation of the rubber-plastic phase and the polyvinyl chloride phase does not occur even at the time of bending the shaped articles, whereby stress-whitening also does not occur. The impact-resistance of polyvinyl chloride composition has heretofore been measured in accordance with ASTM D-256-56 (Izod or Charpy impact strength values). However, as described at pages 199 to 206 of "Modern Plastics", June, 1956, the Izod impact strength test is to subject a notched test sample to destruction, hence the result will eventually be different from the actual strength of the shaped articles.

An important feature of the present invention is that the MBS resins obtained thereby are uniformly dispersed in solvents such as benzene, toluene, and tetralin and that the solution specific viscosity $\nu_{sp}/c$ (4 grams/liter, in benzene) thereof is within the range of from 0.01 to 0.06. The solution viscosity of an MBS resin obtained according to the invention decreases with increase in the degree of cross-linking and increase with decrease in the degree of cross-linking.

We have found that, while the shaped articles obtained by mixing and kneading of an MBS graft copolymer having a value of $\nu_{sp}/c$ lower than 0.01 and a polyvinyl chloride possess excellent transparency, but less effect of imparting impact resistance, when the value of $\nu_{sp}/c$ exceeds 0.06, the effect of imparting impact resistance increases, but particle dispersion becomes difficult, and the transparency of the products is poor. Furthermore, the product is subject to a high degree of stress-whitening.

Many of the MBS resins or ABS resins (butadiene-styrene-acrylonitrile copolymers) produced by heretofore known methods are insoluble in solvents such as benzene, and those which are soluble have solution viscosities exceeding 0.1.

These MBS resins and ABS resins have a further disadvantage in that shaped articles produced by kneaded mixtures of these resins with polyvinyl chlorides do not have very good transparency.

Through consideration of these disadvantageous features of these resins obtained by known methods, we have discovered that there exists a close interrelationship between the solution viscosity and transparency as well as the stress-whitening of MBS resins, as described more fully hereinafter.

A further feature of the present invention is that the index of refraction of the MBS graft copolymer produced thereby are within the range of from 1.528 to 1.540. That is, the indexes of refraction of polyvinyl chlorides and copolymers with vinyl chloride as their principal constituents are from 1.530 to 1.538 at 20° C., and it is important that the indexes of refraction of the MBS resins to be admixed therewith coincide almost exactly with these values. If the index of refraction is outside of the above-stated range, the resulting shaped article will become non-transparent or in some cases produce scattered light of strong purple color.

The indexes of refraction $n_D^{20}$ at 20° C. of polymers of butadiene, methyl methacrylate, and styrene are 1.515, 1.494, and 1.590, respectively, and in the case of the polymers according to the invention, it may be considered that the additive property (or additivity rule) due to the weight composition is approximately realized.

As shown in the graphical representation of the accompanying drawing, when the entire composition of a resin is contained within the region bounded by the reference letters ABCDEF, and, at the same time, the resin possesses a value of $v_{sp}/c$ within the above specified range, mixing and kneading of the resin with a polyvinyl chloride produces a transparent shaped article.

More specifically, it is requisite that the composition of the three monomers be from 24 to 60 percent of butadiene, from 22 to 43 percent of styrene, and from 5 to 46 percent of methyl methacrylate.

A further important feature of the MBS resins according to the invention is the compositional ratio of the rubber constituent and the plastics constituent. Of course, if only impact resistance were to be considered as a problem, as large a rubber content as possible would be desirable, but if the rubber content is increased to an extreme degree, agglomeration or lumping will result from steps such as salting out and drying, or the mixing and kneading with the polyvinyl chloride will be made difficult, and as a result uniform dispersion cannot be attained.

On the other hand, in the case where the rubber content is below 40 weight percent, the effect of imparting impact resistance is small, and the other physical properties of polyvinyl chloride such as heat and temperature resistance and gas impermeability become deficient. That is, the compositional ratio by weight of the rubber constituent and the plastics constituent is preferably in the range of (40 to 75) parts by weight of rubber: (60 to 25) parts by weight of plastics.

For the rubber constituent, a butadiene polymer or a butadiene styrene copolymer which has or has not been cross-linked is used. It has been found that in the case of a butadiene styrene copolymer, a styrene content of 40 weight percent or less produces excellent results.

For the plastics constituent, a polymer produced by causing a monomer mixture of styrene and methyl methacrylate containing a cross-linking agent to be adsorbed and polymerized on rubber latex particles is used. It has been found that the styrene content in the monomer mixture is preferably in the range of from 40 to 80 weight percent.

In this case, it has been found that, rather than the plastics constituent of a specific quantity be polymerized in one step on the rubber constituent, it is preferable to resort to a two-step graft-polymerization process in which the plastics constituent is divided into two parts, and which comprises carrying out a first graft-polymerization step, adding a monomer mixture of styrene and a part of methyl methacrylate containing a cross-linking agent upon completion of the greater part of the first graft-polymerization step, and subsequently carrying out a second graft-polymerization step by adding the remainder portion of methyl methacrylate.

This two-step method has the effect of further improving the properties of the blending of the MBS resin produced with the polyvinyl chloride and increasing the rate of dispersion into the polyvinyl chloride. Furthermore, compatibility of the MBS resins and the polyvinyl chloride increases and the stress-whitening through bending is improved.

The quantity of MMA monomer polymerized in the second step is preferably from 10 to 90 percent by weight to the total methyl methacrylate. Furthermore, even in the case where the graft-polymerization of the plastics constituent with respect to the rubber constituent is carried out in two steps, the cross-linking agent should be added in both the first and second steps.

The cross-linking agent to be added to the rubber component or graft component according to the invention is selected from among those which copolymerize well with styrene, butadiene, and methyl methacrylate. Examples of suitable cross-linking agents are divinyl benzene and dimethacrylates such as mono-, di-, tri-, or tetra-ethylene glycol dimethacrylate and 1, 3-butylene glycol dimethacrylate. The quantity of the cross-linking agent used is from 0.01 to 5 weight percent of the total quantity of the monomers which exist in the copolymers.

The polyvinyl chlorides suitable for use according to the invention are those obtainable by various known methods such as emulsion-polymerization and suspension-polymerization. In addition to independent polymers, it is also possible to use a copolymer consisting of 70 percent or more of vinyl chloride and other monomers to be copolymerized therewith such as mono-olefin monomers, e.g., vinyl acetate, acrylonitrile, vinylidene chloride, alkyl vinyl ether, etc. or mixtures thereof. From 5 to 20 parts by weight of a resin obtained according to the invention is mixed with from 95 to 80 percent by weight of a polyvinyl chloride of the above stated character.

While it is possible to carry out the mixing, in general, with the materials in powder form by means of apparatus such as a roll mill or a Bumbury type mixer, it is also possible to mix the latex obtained and the polyvinyl chloride latex and then to subject the resulting mixture to salting out or spray drying thereby to produce a mixed resin composition.

As described above, the MBS resins according to the invention, when mixed with polyvinyl chlorides, impart excellent transparency and impact resistance to the shaped articles formed from the resulting mixture resins. The use of these MBS resins, however, is not limited to only that for mixing with polyvinyl chlorides, these MBS resins being useful also for mixing with other resins as, for example, chlorinated polyvinyl chloride and vinylidene chloride copolymers thereby to increase their impact-resistant strength.

PREFERRED EMBODIMENTS

In order to indicate still more fully the nature and utility of the present invention, the following examples of practice thereof are set forth, it being understood that these examples are presented as being illustrative only, and that they are not intended to limit the scope of the invention.

EXAMPLE 1

A 10-liter stainless-steel autoclave provided with an agitator was charged under a vacuum with a monomer mixture consisting of 1 gram of cumene hydroperoxide (CHP), 800 grams of butadiene, 200 grams of styrene, and 5 grams of triethylene glycol dimethaacrylate (DMA) and 3,000 cc. of distilled water containing 10 grams of Na-bisoctyl sulfosuccinate, 0.05 gram of EDTA-disodium mono-hydride, 0.05 gram of formaldehyde sodium sulfoxylate (Ronglite), 0.03 gram of ferrous sulphide, and 0.15 gram of sodium pyrophosphate. The materials thus charged were then caused to react at 40° C. for approximately 17 hours, at which time no further pressure drop was observable.

Next, to the resulting charge, a monomer mixture of 300 grams of styrene containing 0.5 gram of CHP and 3 grams of DMA and 200 grams of methyl methacrylate, 0.3 gram of Rongalite, and 1,500 cc. of distilled water were added, and the resulting mixture was agitated at high speed for 30 minutes. Thereafter, the charge was heated to 60° C. and caused to react for 5 hours.

To the latex thus obtained, 200 grams of methyl methacrylate containing 0.2 gram of CHP and 1.0 gram of DMA, 0.1 gram of Rongalite, and 600 cc. of distilled water were further added, which was then agitated for 30 minutes. Thereafter, the batch was maintained at an elevated temperature of 60° C. and caused to react for 5 hours.

The latex thus obtained was salted out at 50° C. with a 1-percent salt solution, further heat-treated at 80° C., and filtered. The powder particles filtered out were washed with water and then dried, whereupon an MBS resin of $\nu_{sp}/c$ value of 0.032 was obtained with a yield of 98.5 percent.

13 parts of this resin was mixed with 87 parts of a polyvinyl chloride of a polymerization degree of 800 containing 2 parts of dibutyl-tin-dilaurate, and the resulting mixture was roll-kneaded at 140° C. for 4 minutes and then pressed at 190° C. under a pressure of 100 kg./cm.² into a sheet of 3 mm. thickness.

The Charpy impact strength of this sheet as tested on a notched test piece according to ASTM D-256-56 was 85 kg.cm./cm.². The light transmittance of the sheet according to ASTM D-1003-52 was 81.5 percent, and the haze value was 3.5 percent. Furthermore, when a sheet of 1 mm. thickness of the same resin was bent through 180° C. at 25° C., clouding was observed to be extremely less.

In addition, when a mixture of 0.1 part of calcium stearate, 0.36 part of zinc stearate, and 6 parts of an epoxy compound of soybean oil was used in place of the above described stabilizing agent, and bottles, each of 530 cc. capacity and 25-gram weight, were formed by means of an extruding machine, bottles of excellent transparency were obtained very easily.

Fifty of these bottles were cooled to 5° C., filled with water, and subjected to repeated free drop tests from a height of 1 meter until breakage occurred. As a result, the average number of drops for breakage was 29 drops. For comparison, a similar test was carried out with similar bottles produced from only a polyvinyl chloride, in which case the average result was 2 drops for breakage.

EXAMPLE 2

The process as set forth in Example 1 was followed except that the degree of cross-linking was changed, and the methyl methacrylate to be added in the second step was added in the first step. Representative examples relating to the resulting products are indicated in the accompanying Table 1.

TABLE 1

| | Rubber constituent | | | Plastics constituent | | | | |
|---|---|---|---|---|---|---|---|---|
| Sample | Butadiene (parts by weight) | Styrene (parts by weight) | DMA* (parts by weight) | Styrene (parts by weight) | Methyl-methacrylate (parts by weight) | DMA* (parts by weight) | Methyl-methacrylate (parts by weight) | DMA* (parts by weight) |
| (Invention): | | | | | | | | |
| A | 40 | 10 | 0.25 | 15 | 20 | 0.175 | 0 | 0 |
| B | 40 | 10 | 0.25 | 15 | 10 | 0.850 | 10 | 0.3 |
| C | 40 | 10 | 0.25 | 15 | 10 | 0.500 | 10 | 0.2 |
| D | 40 | 10 | 0.25 | 15 | 10 | 0.30 | 10 | 0.1 |
| E | 40 | 10 | 0.25 | 15 | 10 | 0.15 | 10 | 0.05 |
| (Comparative samples): | | | | | | | | |
| F | 40 | 10 | 0 | 15 | 10 | 0 | 10 | 0 |
| G | 40 | 10 | 0.25 | 15 | 10 | 0 | 10 | 0 |
| H | 40 | 10 | 0.60 | 15 | 10 | 0 | 10 | 0 |
| I | 40 | 10 | 1.20 | 15 | 10 | 0 | 10 | 0 |

*DMA: Triethylene-glycoldimethacrylate.

| Sample | $\eta_{sp}/c$ | Impact resistance rise (percent)* | Number of repeated drops (500 cc., 25 g. bottle) | Transparency, percent | Anti-stress-whitening through bending |
|---|---|---|---|---|---|
| (Invention): | | | | | |
| A | 0.045 | 13 | 20 | 79.0 | Good. |
| B | 0.013 | 15 | 19 | 83.5 | Excellent. |
| C | 0.020 | 13 | 22 | 83.2 | Do. |
| D | 0.025 | 12 | 25 | 82.2 | Do. |
| E | 0.032 | 11 | 20 | 81.5 | Do. |
| (Comparative samples): | | | | | |
| F | 0.080 | 10 | 9 | 67.0 | Poor. |
| G | 0.065 | 11 | 10 | 68.3 | Do. |
| H | 0.040 | 11 | 9 | 72.2 | Do. |
| I | 0.035 | 12 | 8 | 76.4 | Do. |

*Charpy impact strength tests were carried out on notched test pieces of resins with varying blend proportions, and the point of transition from brittle fracture to ductile fracture was taken in each case.

EXAMPLE 3

50 parts by weight of rubber constituent obtained in exactly same manner as set forth in Example 1 was graft-polymerized with 35 parts by weight of styrene and methyl methacrylate monomer mixtures, in which the methyl methacrylate was divided into two parts in accordance with the ration shown in the following Table 2 and added to the rubber constituent in two separate steps. The solution viscosity and physical properties of the PVC shaped articles are shown in Table 2.

TABLE 2

| Sample | Rubber constituent, parts by weight | | | Plastics constituent, parts by weight | | | | | $\eta_{sp}/c$ | Impact resistance rise (percent) | Number of repeated drops (500 cc., 25 g. bottle) | Transparency (percent) | Anti-stress-whitening property through bending |
|---|---|---|---|---|---|---|---|---|---|---|---|---|---|
| | Butadiene | Styrene | DMA | Styrene | Methyl-methacrylate | DMA | Methyl-methacrylate | DMA | | | | | |
| (A) | 40 | 10 | 0.25 | 15 | 20 | 0.175 | 0 | 0 | 0.045 | 13 | 20 | ¹79.0 | Good. |
| J | 40 | 10 | 0.25 | 15 | 15 | 0.175 | 5 | 0.025 | 0.032 | 12 | 22 | ¹80.5 | Excellent. |
| (E) | 40 | 10 | 0.25 | 15 | 10 | 0.150 | 10 | 0.05 | 0.032 | 11 | 29 | ¹81.5 | Do. |
| K | 40 | 10 | 0.25 | 15 | 5 | 0.125 | 15 | 0.075 | 0.033 | 13 | 27 | ¹81.5 | Do. |
| L | 40 | 10 | 0.25 | 15 | 2 | 0.120 | 18 | 0.080 | 0.033 | 15 | 15 | ¹81.0 | Do. |
| | | | DVB* | | | DVB* | | DVB* | | | | | |
| M | 40 | 10 | 0.25 | 15 | 10 | 0.150 | 10 | 0.05 | 0.028 | 12 | 28 | ¹82.0 | Do. |

¹ Glass clear.
*DVB: Divinyl-benzene.

EXAMPLE 4

50 parts by weight of the rubber constituent obtained in exactly same manner as set forth in Example 1 was graft-polymerized with 35 parts by weight of styrene and methyl methacrylate monomer mixture at a ratio as indicated in the following Table 3, in which the methyl methacrylate is divided into two parts and added to the rubber constituent in two separate steps.

The solution viscosity and physical properties of PVC shaped articles obtained in the same manner as in Example 1 are shown in Table 3.

TABLE 3

| Sample | Rubber constituent, parts by weight | | | Plastics constituent, parts by weight | | | | | $\eta_{sp}/c$ | Impact resistance rise (percent) | Number of repeated drops (500 cc., 25 g. bottle) | Transparency (percent) | Anti-stress-whitening property through bending |
|---|---|---|---|---|---|---|---|---|---|---|---|---|---|
| | Butadiene | Styrene | DMA | Styrene | Methyl-methacrylate | DMA | Methyl-methacrylate | DMA | | | | | |
| X* | 40 | 10 | 0.25 | 5 | 20 | 0.15 | 10 | 0.05 | 0.031 | 12 | 10 | ¹ 70.0 | Excellent. |
| O* | 40 | 10 | 0.25 | 10 | 15 | 0.15 | 10 | 0.05 | 0.032 | 13 | 15 | ¹ 75.0 | Do. |
| (E) | 40 | 10 | 0.25 | 15 | 10 | 0.15 | 10 | 0.05 | 0.032 | 11 | 29 | ² 81.5 | Do. |
| P | 40 | 10 | 0.25 | 20 | 5 | 0.15 | 10 | 0.05 | 0.031 | 13 | 22 | ² 80.5 | Good. |
| Q* | 40 | 10 | 0.25 | 30 | 2 | 0.15 | 3 | 0.05 | 0.032 | 12 | 8 | ³ 65.0 | Poor. |

¹ Strong yellow.  ² Glass clear.  ³ Strong blue.

*Samples N, O, and Q are presented for comparison purposes, in which N and O indicates the caes where the amount of styrene is extremely small, and Q indicates the case where the amount of MMA is extremely small.

As seen from Table 3, above when the quantity of styrene in the rubber constituent is small (Sample Nos. N and O), the obtained article assumes strong yellow and possesses poor transparency. On the contrary, when the quantity of styrene is large, the shaped product assumes strong blue, is non-transparent, and poor in anti-stress-whitening through bending. In order therefore to obtain the shaped product satisfying the desired properties, the optimum blending rate of styrene and methyl methacrylate is 40–80 percent by weight of styrene and 60–20 percent by weight of methyl methacrylate.

EXAMPLE 5

50 parts by weight of rubber constituent obtained in exactly same manner as set forth in Example 1 was graft-polymerized with varying blend rate of styrene and methyl methacrylate monomer mixture and resins respectively containing 80, 59, and 38 percent of the rubber constituent were obtained as shown in Table 4 below.

The solution viscosity and physical properties of PVC shaped article obtained in accordance with Example 1 are shown in Table 4.

TABLE 4

| Sample | Rubber constituent, parts by weight | | | Plastics constituent, parts by weight | | | | | Rubber content (percent) | $\eta_{sp}/c$ | Impact resistance rise (percent) | Number of repeated drops (500 cc., 25 g. bottle) | Transparency (percent) | Anti-stress whitening property through bending |
|---|---|---|---|---|---|---|---|---|---|---|---|---|---|---|
| | Butadiene | Styrene | DMA | Styrene | Methyl-methacrylate | DMA | Methyl-methacrylate | DMA | | | | | | |
| R* | 40 | 10 | 0.25 | 5.5 | 35 | 0.054 | 3.5 | 0.0175 | 80 | 0.029 | 8 | 12 | ¹ 77.0 | Poor. |
| (E) | 40 | 10 | 0.25 | 15 | 10 | 0.15 | 10 | 0.05 | 59 | 0.032 | 11 | 29 | ² 81.5 | Excellent. |
| S* | 40 | 10 | 0.25 | 35 | 23 | 0.35 | 23 | 0.115 | 38 | 0.036 | 18 | 5 | ² 79.0 | Do. |

¹ Slight yellow.
² Glass clear.
*Samples R and S are presented for comparison purposes.

As seen from Table 4, above in case the rubber content is large (Sample No. R), a good result can be obtained when the shaped article is subjected to Charpy impact strength test, though the actual destruction resistance thereof is poor and its anti-stress-whitening property is also inferior. This is due to the fact that, as the rubber content in the resin thus obtained is high, the resin is prone to coagulate at the time of salting out, which prevent it from dispersing perfectly in the polyvinyl chloride. On the other hand, when the rubber content is small (Sample No. S), the impact resistance thereof deteriorates extremely.

What we claim is:

1. A process for producing a graft copolymer of styrene and methyl methacrylate upon a butadiene polymer compatible with polyvinyl chloride, and for use in obtaining a polyvinyl chloride resin composition having improved transparency, impact resistance, anti-stress-whitening through bending, which comprises:

a. preparing a latex of a butadiene polymer by polymerizing a monomer selected from the group consisting of butadiene, and a mixture of butadiene as the principal constituent and styrene in the presence of a small quantity of a divinyl cross-linking agent, said polymer latex containing from 40 to 75 parts by weight of said butadiene polymer;

b. adding to said latex from 60 to 25 parts by weight of styrene and methyl methacrylate monomers in a ratio of 40–80 parts by weight of styrene to 60–20 parts by weight of methyl methacrylate and a small quantity of a divinyl cross-linking agent copolymerizable with said monomers, 1. said methylmethacrylate being divided into two portions, from 10 to 90 percent by weight of which is added to the latex together with said 40 to 80 parts by weight of styrene in the first stage graft polymerization, and
   2. the remainder portion of which is added singly to the latex in the second stage graft-polymerization, when a greater part of the first polymerization step is completed,
   3. the quantity of said cross-linking agent being in the range of from 0.01 to 5 percent by weight of the total quantity of the monomers existing in the copolymer and being present in each monomer portion; and c. reacting the mixture to form said graft copolymer.

2. The process according to claim 1, wherein the cross-linking agent is one selected from the group consisting of divinyl benzene, diethylene glycol dimethacrylate, triethylene glycol dimethacrylate, tetra-ethylene glycol dimethacrylate, and 1,3-butylene glycol dimethacrylate.

* * * * *